US005604279A

United States Patent [19]

Bernhardt et al.

[11] Patent Number: 5,604,279

[45] Date of Patent: Feb. 18, 1997

[54] COLORANT PREPARATION FOR PRODUCING MASTERBATCHES

[75] Inventors: Uwe Bernhardt, Bad Ems; Rainer Bott, Koblenz, both of Germany

[73] Assignee: Hoechst Aktiengesellschaft, Germany

[21] Appl. No.: 402,631

[22] Filed: Mar. 13, 1995

[30] Foreign Application Priority Data

Mar. 15, 1994 [DE] Germany .......................... 44 08 682.2
Dec. 6, 1994 [DE] Germany .......................... 44 43 316.6

[51] Int. Cl.[6] ................................ C08J 3/00; C08K 3/26; C08K 9/00; C08L 57/02

[52] U.S. Cl. .......................... 524/427; 523/206; 523/351; 524/230; 524/308; 524/306; 524/310; 524/317; 524/318; 524/320; 524/425; 524/442; 524/499

[58] Field of Search .................................... 524/230, 308, 524/306, 310, 317, 318, 320, 425, 427, 442, 499; 523/206, 351

[56] References Cited

U.S. PATENT DOCUMENTS 3,455,871 7/1969 Coover, Jr. ................................ 260/41
4,039,507 8/1977 Paige et al. .......................... 260/42.46
4,911,830 3/1990 Bromley et al. ................... 252/301.16

FOREIGN PATENT DOCUMENTS 56-020053 2/1981 Japan .
01261440 10/1989 Japan .
1080745 8/1967 United Kingdom .

OTHER PUBLICATIONS

European Search Report No. 95102767.1, Oct. 18, 1995.
Derwent Publication, JP A 01 261 440.
Derwent Publication, JP A 56 020 053.

*Primary Examiner*—Paul R. Michl
*Assistant Examiner*—Patrick Niland
*Attorney, Agent, or Firm*—Connolly & Hutz

[57] ABSTRACT

A colorant composition consisting essentially of one or more colorants finely dispersed in an amorphous poly-α-olefin which is composed of at least two different monomers having a butene-1 content of at least 25% by weight and melts at between 70° and 150° C., and a free-flow agent provides the way to dust-free colorant compositions for masterbatch production, the production of compounds and the direct coloration of plastomers and elastomers.

16 Claims, No Drawings

COLORANT PREPARATION FOR PRODUCING MASTERBATCHES

The present invention relates to a colorant preparation comprising at least one colorant very finely dispersed in a meltable base material which is solid at room temperature. Such colorant preparations, especially pigment preparations, are especially suitable for producing masterbatches. A masterbatch is a granular, dust-free concentrate of a plastomer or elastomer with high quantities of colorants. Masterbatches are used for coloring plastics by adding them to the granular plastic to be colored before extrusion or injection molding. Direct coloration of plastics with pigments or dyes has not gained acceptance because of poor dispersion, health concerns and the high cost of cleaning the apparatus.

Processes for producing masterbatches and their various fields of use are extensively described in the literature. At present the following processes are known for producing dust-free, pulverulent pigment and dye preparations:

Hot mixing using suitable base materials, such as polyethylene wax, PVC powder or EVA (ethylene-vinyl acetate copolymers). Disadvantages of these base materials are their low binding power and their lack of universality in relation to the incorporation into plastics.

Extrusion and kneading with subsequent grinding. This process is very complicated and costly. It requires the use of base materials which are compatible with the plastic to be colored and possess good grinding characteristics.

Extrusion and subsequent fine spraying or hot die face cutting. This process is likewise very costly. The base materials used here include waxes and resins.

U.S. Pat. No. 3,527,844 describes a process for preparing pigment concentrates for coloring polyolefins wherein the base material used is a mixture of an ethylene-propylene copolymer and a propylene polymer.

U.S. Pat. No. 3,409,585 discloses a pigment preparation in which the pigment particles are coated in an amorphous homo- or copolymer of propylene, butene-1 and hexene-1 or a propylene-ethylene block polymer. Its production involves filtration and drying steps.

JP-88/88287 discloses preparations consisting of pigment, lubricant, fillers and an amorphous polyolefin.

CA-A-1 066 833 relates to pigment concentrates for coloring thermoplastics, comprising pigment, polyolefin wax, an EVA copolymer and colloidal silica.

All prior art pigment preparations for polymer coloration include ingredients incompatible with the polymer to be colored; are, owing to the less favorable base material, distinctly weaker and duller in color for the same pigment content; exhibit poorer filterability, inhomogeneity and poorer spinnability; need to be made using complicated, costly dispersing apparatus (e.g. twin-screw extruders); and cannot be produced in the same, high colorant concentration with the below-described property profile.

It is an object of the present invention to provide dust-free colorant preparations for masterbatch production, compoundmaking and direct coloration of plastomers and elastomers that are economically and ecologically advantageous to produce and yield products of high quality, especially masterbatches with a high spinnability and long filter lives in the polypropylene and polyester fiber sector and better film quality in the polyethylene and polypropylene sector.

This object is surprisingly achieved when the colorant is first predispersed in a poly-α-olefin base material together with a free-flow agent in a heating-cooling mixing process.

The colorant composition thus produced can be used for producing masterbatches and compounds or for the direct coloration of plastics.

The present invention accordingly provides a colorant composition consisting essentially of one or more colorants finely dispersed in an amorphous poly-α-olefin which is composed of at least two different monomers having a butene-1 content of at least 25% by weight and melts at between 70° and 150° C., and a free-flow agent.

Preferred colorant compositions contain 60 to 90% by weight, preferably 70 to 85% by weight, of an organic or inorganic pigment, 5 to 39% by weight, preferably 8.5 to 35% by weight, of the amorphous poly-α-olefin, 0.1 to 10% by weight, preferably 0.5 to 7.5% by weight, of a free-flow agent and also 0 to 15% by weight of customary fillers or additives.

Preferred poly-α-olefins for the purposes of the present invention are terpolymers, preferably containing ethylene, propylene and butene-1 units. Other olefins, for example hexene-1, are likewise suitable for use as monomer units. Preference is given to ethylene-propylene-butene terpolymers having a butene-1 content of 25 to 80% by weight, preferably 30 to 75% by weight, especially 65 to 70% by weight. Particular preference is given to terpolymers having a melt viscosity (at 190° C.) of 2500 to 8200 mPas and an average molecular weight of 40 000 to 50 000. These terpolymers are advantageously produced by a conventional low pressure polymerization of the monomers in the presence of Ziegler-Natta catalysts.

Instead of the terpolymers it is also possible to use a poly-α-olefin containing ethylene and butene-1 or propylene and butene-1, in each case with a butene-1 content of at least 25% by weight, preferably from 30 to 80% by weight.

The free-flow agent used is silica, preferably pyrogenic silica, chalk, a silicate, preferably an aluminum silicate, a sodium silicate, a sodium aluminum silicate or a calcium silicate, or a polyol ester of a long-chain fatty acid, oleamide or a partial fatty acid glyceride. The pyrogenic silica has a particle size of about 0.007 to 0.015 μm.

The colorant is an organic or inorganic dye or pigment. A preferred organic pigment is an azo or disazo pigment, a laked azo or disazo pigment or a polycyclic pigment, preferably a phthalocyanine, quinacridone, perylene, dioxazine, anthraquinone, thioindigo, diaryl or quinophthalone pigment.

A suitable inorganic pigment comprises suitable pigmenting metal oxides, mixed oxides, aluminum sulfates, chromates, metal powders, pearl luster pigments (mica), phosphors, titanium oxides, cadmium-lead pigments, preferably iron oxides, carbon black, silicates, nickel titanates, cobalt pigments or chromium oxides.

The proportions of poly-α-olefin and free-flow agent required are dependent on the surface structure and particle size of the colorants used and must be adapted thereto.

If organic pigments are used, a colorant composition containing 60 to 80% by weight of organic pigment, 12.5 to 35% by weight of the amorphous poly-α-olefin, 0.5 to 5% by weight of free-flow agent and also 0 to 7.5% by weight of customary fillers or additives is particularly advantageous.

If inorganic pigments are used, a colorant composition containing 79 to to 85% by weight of inorganic pigment, 12.5 to 20.5% by weight of the amorphous poly-α-olefin, 0.5 to 2.5% by weight of free-flow agent and 0 to 2% by weight of customary fillers or additives is particularly advantageous.

Carbon blacks are advantageously formulated in the same way as organic formulations in order that dust-free preparations may be obtained.

The colorant compositions of the present invention may additionally include further additives, such as fillers, for example lubricants, antistats, antiblocking agents, antislip agents and/or suspension stabilizers.

The present invention also provides a process for producing the colorant compositions by first premixing the individual components, then heating the mixture to a temperature of 5° to 50° C. above the softening point of the amorphous poly-α-olefin with mechanical mixing, and finally cooling the mixture to a temperature of 10° to 30° C.

The premixing of the individual components can be carried out at room temperature in a suitable mixing apparatus, and serves to obtain good predispersion. This is followed by hot mixing with thorough intermixing, advantageously in a first phase up to about 5° C. above the softening point of the poly-α-olefin and in a second phase up to about 10° to 50° C., preferably 20° to 40° C., above the softening point of the poly-α-olefin. The first phase lasts about 5 to 20 minutes, preferably 7 to 10 minutes, and the second phase about 2 to 15 minutes, preferably 4 to 10 minutes. The hot mixing step is followed by a cooling mixing step in which the colorant composition is cooled down to 10° to 30° C. This step normally takes 5 to 20 minutes, preferably 10 to 15 minutes.

The thermal energy for the hot mixing step can be introduced via friction, via separate heating of the mixing trough or both. It is advantageous to preheat to about 30° C. Higher starting temperatures for the hot mixing step lead to clumping of the base material and to the formation of deposits. Cooling the mixing trough to the preheating temperature after the hot mixing step is likewise advantageous.

The subsequent cooling mixing step may be accompanied by the addition of up to 0.5% by weight of further free-flow agent, based on the total mixture, in order that a particle size of 0.05 to 3 mm may be obtained for the dust-free powder mixture. Subsequent removal by classification is also possible. If the particle size is not especially important in subsequent processes, for example if the mixture is to be used in a recipe involving thorough mixing, the cooling process can be omitted. The agglomerates which form in the discharge vessel under normal cooling are simple to redivide using an appropriate mixing technique.

Since the process of the present invention does not give rise to residues it does not require the filtration and drying steps necessary in the prior art.

The process of the present invention gives a dust-free preparation. By varying the compositions and the cooling mixing time it is possible to obtain different particle size distributions and thus produce a structure adapted to the end-use.

The dust-free mixtures surprisingly exhibit very good compatibilities in various plastics. Compared with known and comparable pigment preparations, the coloring agents produced from these mixtures have a distinctly higher color strength, higher brilliance and a better filter value. Furthermore, a distinct improvement in quality is obtainable in migration-sensitive applications. The use of these preparations in waxes distinctly improves the granulability, especially the strand granulability.

The colorant compositions of the present invention are used in particular for producing masterbatches. The production of masterbatches advantageously likewise involves an initial mixing process. First a mixture is produced from the colorant composition of the present invention, a base plastic, dispersant and additives. The mixture is produced using an appropriate mixing technique. However, there is no need to prepare mixtures if the individual components of a formulation are fed directly into the extrusion apparatus. In most cases, however, this entails a reduction in the quality of the end-product and is therefore only practiced with inorganic pigments. The said mixture is then fed by means of a suitable metering device into an extrusion apparatus. Generally this is a single- or twin-screw extruder, but continuous and batchwise kneaders are also used. This is followed by a granulating step. Granulation is by strand and head granulation, but spraying is also possible.

To produce certain specialty colors, monopreparations are blended in a second extrusion process with one another or only with plastic. Hitherto, in the production of specialty colors, the high consumption of monobatch was a disadvantage. Production costs were also increased by the second extrusion, in some cases even by a third extrusion. These disadvantages are eliminated by using the colorant compositions of the present invention.

The colorant compositions of the present invention can also be used for compounds and also for the direct coloration of plastics. Compounds here are mixtures of polymers with aforementioned additives, fillers and/or colorants.

The colorant composition of the present invention is used for coloring for example polyolefins, polyvinyl chloride (PVC), ethylene-vinyl acetate copolymers (EVA), styrene-acrylonitrile copolymers (SAN), polymethyl methacrylate (PMMA), polyethylene glycol terephthalate (PET), polybutylene glycol terephthalate (PBT) and copolyesters thereof, acrylonitrile-butadiene-styrene copolymers (ABS), polyethylene waxes, polypropylene waxes, amide waxes, hydrocarbon resins, montan waxes, aliphatic waxes, rubber, butyl rubber, styrene block copolymers and bitumen.

In plastics, specifically in masterbatch production, the dust-free powder mixture of the present invention is used in the same way as normal pigment. It is merely necessary to recalculate the concentration used on the basis of the pure pigment content. The hot mixing of the entire formulation, frequently customary for organic pigments, can be omitted. It is also possible to reduce the otherwise customary use of dispersing aids, for example waxes.

The novel process for treating the pigments and the associated improved wetting and predispersion of the colorant by the poly-α-olefin has the effect of improving the quality of the mixing of the formulation as a whole. The absence of dust also ensures improved handling of the colorant; that is, not only subsequent mixing in the total recipe but also direct metering can take place without quality and processing limitations.

The colorant compositions of the present invention have a number of other important application advantages, for example good dispersion in color and additive batches and hence a high level of quality, a wide range of use and flexibility, since they are compatible with most common elastomers and plastomers, excellent spinning properties in polypropylene and polyester fibers, high film quality in polyester and polypropylene films, simplified production of specialty colors and special effect batches, brilliant colors in injection molding, blow molding, film production, ribbon fabrication and spin dyeing.

The Examples which follow were each carried out using a poly-α-olefin prepared from the monomers ethylene, butylene and propylene and having the following material parameters:

| Poly-α-olefin 1: | |
|---|---|
| Melt viscosity at 190° C. (rotary viscometer): | about 7800 mPas |
| Butene-1 content: | about 70% by weight |
| Softening point, ring and ball (DIN 52011) | about 85° C. |
| Viscosity number (DIN 53728) | 55 $cm^3/g$ |
| Density at 23° C. (DIN 53479) | 0.87 $g/cm^3$ |
| Linear expansion coefficient | $2.4 \times 10^{-4}K^{-1}$ |
| Poly-α-olefin 2: | |
| Melt viscosity at 190° C.: | about 2500 mPas |
| Butene-1 content: | about 30% by weight |
| Softening point: | about 125° C. |
| Density at 23° C. (DIN 53479): | 0.87 $g/cm^3$ |

They are used in the finely granular state (ground).

| The free-flow agent used was: | |
|---|---|
| Pyrogenic silica: | |
| Specific gravity | 2.2 $g/cm^3$ |
| Refractive index | 1.46 |
| Structure | amorphous |
| Particle size | 0.007μ |

The dye compositions of the present invention were prepared as described below:

| | |
|---|---|
| Mixer: | 5 liter capacity combined heating-cooling mixing apparatus |
| Batch: | in accordance with the below-indicated Examples |
| Premixing: | batch about 1 min at 350 $min^{-1}$ |
| Hot mixing: | |
| 1st phase: | 3100 $min^{-1}$ 90° C.–100° C. |
| Mixing time: | about 7 min–10 min |
| 2nd phase: | 3100 $min^{-1}$ 95° C.–120° C. |
| Mixing time: | about 4 min–10 min |
| Cooling-mixing: | down to 20°–30° C. |
| Mixing time: | 10 min–15 min at 360 $min^{-1}$ |

Energy input was exclusively via friction. The mixture thus produced had an average particle size of about 0.5 to 3.0 mm.

PREPARATION EXAMPLES

The following colorant compositions were prepared by above-described processes. The poly-α-olefin used was in each case the above-described poly-α-olefin 1 or poly-α-olefin 2:

1) 75% by weight of C.I. Pigment Yellow 83 (C.I. No. 21 108), 1.5% by weight of pyrogenic silica and 23.5% by weight of poly-α-olefin
2) 75% by weight of C.I. Pigment Black 7 (C.I. No. 77 266), 0.5% by weight of pyrogenic silica and 24.5% by weight of poly-α-olefin
3) 75% by weight of C.I. Pigment Red 38 (C.I. No. 21 120), 1% by weight of pyrogenic silica and 24% by weight of poly-α-olefin
4) 75% by weight of C.I. Pigment Blue 15:1 (C.I. No. 74 160), 0.5% by weight of pyrogenic silica and 24.5% by weight of poly-α-olefin
5) 75% by weight of C.I. Pigment Green 7 (C.I. No. 74 260), 3% by weight of pyrogenic silica and 22% by weight of poly-α-olefin
6) 75% by weight of C.I. Solvent Blue 122 (C.I. No. 60 744), 5% by weight of pyrogenic silica and 20% by weight of poly-α-olefin
7) 85% by weight of C.I. Pigment White 6 (C.I. No. 77 891), 2.5% by weight of pyrogenic silica and 12.5% by weight of poly-α-olefin
8) 40% by weight of C.I. Solvent Violet 13 (C.I. No. 60 725), 30% by weight of C.I. Pigment Blue 15:3 (C.I. No. 74 160), 10.5% by weight of an antistat, 1% by weight of pyrogenic silica and 18.5% by weight of poly-α-olefin
9) 70% by weight of C.I. Pigment Red 146 (C.I. No. 12 515), 22.5% by weight of poly-α-olefin, 7.0% by weight of oleamide, 0.5% by weight of pyrogenic silica
10) 60% by weight of C.I. Pigment Black 7 (C.I. No. 77 266), 35% by weight of poly-α-olefin, 5% by weight of a neutral, partial fatty acid ester of glycerol
11) 70% by weight of C. I. Pigment Brown 25 (C.I. No. 12 510), 22% by weight of poly-α-olefin, 7.5% by weight of partial fatty acid ester of pentaerythritol, 0.5% by weight of pyrogenic silica
12) 75% by weight of C.I. Pigment Green 7 (C.I. No. 74 260), 19.5% by weight of poly-α-olefin, 5% by weight of barium sulfate, 0.5% by weight of pyrogenic silica.

USE EXAMPLES

The colorant compositions of Preparation Examples 1 to 8 were used via a masterbatch or directly in powder form for coloring plastics. The following plastics were used:

1) Polyester: polyethylene terephthalate, polybutylene terephthalate;
2) Polyethylene (PE);
3) Polypropylene (PP);
4) Styrene-acrylonitrile copolymers (SAN);
5) Polyvinyl chloride (PVC);
6) Polymethyl methacrylate.

Tests of the color strength (⅓ standard depth of shade), filter value, film quality and processing in PP and polyester spin dyeing demonstrated a distinct improvement in quality over commercial products. Color strength increases of up to 25% were obtained, coupled with higher brilliance and cleanness, a distinct improvement in the filter values and also a distinct improvement in processing in the PP fiber sector and in the spinning of polyester fibers, even in the case of unusual concentrations of colorants and fillers.

What is claimed is:

1. A colorant composition consisting essentially of to 60 to 90% by weight of an organic or inorganic pigment finely dispersed in an amorphous poly-α-olefin which is composed of at least two different monomers having a butene-1 content of at least 25% by weight and having a softening point value of between 70° and 150° C., and a free-flow agent selected from the group consisting of silica, chalk, a silicate and polyol ester of a long-chain fatty acid, oleamide or a partial fatty acid glyceride.

2. The colorant of claim 1 containing 60 to 90% by weight of an organic or inorganic pigment, 5 to 39% by weight of the amorphous poly-α-olefin, 0.1 to 10% by weight of a free-flow agent and 0 to 15% by weight of lubricants, antistats, antiblocking agents, antislip agents or suspension stabilizers or mixture thereof.

3. The colorant composition of claim 1 containing 70 to 85% by weight of an organic or inorganic pigment, 8.5 to 35% by weight of the amorphous poly-α-olefin, 0.5 to 7.5% by weight of a free-flow agent and 0 to 15% by weight of lubricants, antistats, antiblocking agents, antislip agents or suspension stabilizers or mixture thereof.

4. The colorant of claim 2 containing 60 to 80 by weight of organic pigment, 12.5 to 35% by weight of the amorphous poly-α-olefin, 0.5 to 5% by weight of free-flow agent and 0 to 7.5% by weight of lubricants, antistats, antiblocking agents, antislip agents or suspension stabilizers or mixture thereof.

5. The colorant composition of claim 2 containing 79 to 85% by weight of organic pigment, 12.5 to 20.5% by weight of the amorphous poly-α-olefin, 0.5 to 2.5% by weight of free-flow agent and 0 to 2% by weight of lubricants, antistats, antiblocking agents, antislip agents or suspension stabilizers or mixture thereof.

6. The colorant composition of claim 1 wherein the amorphous poly-α-olefin is a terpolymer.

7. The colorant composition of claim 6 wherein the terpolymer contains ethylene, propylene and butene-1 units.

8. The colorant composition of claim 6 wherein the terpolymer has a butene-1 content of 25 to 80% by weight.

9. The colorant composition of claim 6 wherein the terpolymer has a butene-1 content of 30 to 75% by weight.

10. The colorant composition of claim 6 wherein the polymer has a melt viscosity of 190° C. of 2500 to 8200 mPas.

11. The colorant composition of claim 1 wherein the poly-α-olefin contains ethylene and butene-1, or propylene and butene-1, in each case with a butene-1 content of 30 to 80% by weight.

12. The colorant composition of claim 1 wherein the free-flow agent is pyrogenic silica, or an aluminum silicate, a sodium aluminum silicate or a calcium silicate.

13. The colorant composition of claim 1 wherein the organic pigment is an azo or disazo pigment, a laked azo or disazo pigment or a polycyclic pigment.

14. The colorant composition of claim 1 wherein the organic pigment is a phthalocyanine, quinacridone, perylene, dioxazine, anthraquinone, thioindigo, diaryl or quinophthalone pigment.

15. A process for preparing a colorant composition as claimed in claim 1, which comprises first premixing the individual components, then heating the mixture to a temperature of 5° to 50° C. above the softening point of the amorphous poly-α-olefin with mechanical mixing, and finally cooling the mixture to a temperature of 10° to 30° C.

16. A process for preparing a masterbatch which comprises incorporating a colorant composition as claimed in claim 1 into a plastic material.

* * * * *